(12) United States Patent
Hamada et al.

(10) Patent No.: US 9,207,252 B2
(45) Date of Patent: Dec. 8, 2015

(54) SPEED DETECTION APPARATUS AND DRIVING MECHANISM CONTROL APPARATUS

(71) Applicant: CANON KABUSHIKI KAISHA, Tokyo (JP)

(72) Inventors: Shuhei Hamada, Yokohama (JP); Hisatoshi Baba, Yokohama (JP); Takashi Fukuhara, Higashikurume (JP); Yasuyuki Miyaoka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 14/085,087

(22) Filed: Nov. 20, 2013

(65) Prior Publication Data

US 2014/0144757 A1    May 29, 2014

(30) Foreign Application Priority Data

Nov. 26, 2012  (JP) ................................. 2012-257508

(51) Int. Cl.
*G01P 3/68* (2006.01)
*B65G 43/00* (2006.01)

(52) U.S. Cl.
CPC .. *G01P 3/68* (2013.01); *B65G 43/00* (2013.01)

(58) Field of Classification Search
CPC .................. B65G 43/00; B65G 43/02; B65G 2203/0291; G01P 3/68
USPC .......................... 198/502.4, 810.01
See application file for complete search history.

(56) References Cited

U.S. PATENT DOCUMENTS

| | | | | |
|---|---|---|---|---|
| 2,989,690 A | * | 6/1961 | Cook | 324/206 |
| 4,409,852 A | * | 10/1983 | Suzuki et al. | 73/862.392 |
| 5,383,014 A | * | 1/1995 | Nowak et al. | 356/28 |
| 6,118,132 A | * | 9/2000 | Tullis | 250/559.39 |
| 6,842,602 B2 | * | 1/2005 | Kudo | 399/303 |
| 7,424,255 B2 | * | 9/2008 | Sakai | 399/301 |
| 7,659,996 B2 | * | 2/2010 | Kudo et al. | 356/616 |
| 8,064,809 B2 | * | 11/2011 | Yamaguchi et al. | 399/301 |
| 8,527,236 B2 | * | 9/2013 | Takahama et al. | 702/150 |
| 8,953,174 B2 | * | 2/2015 | Fukuhara | 356/614 |
| 8,977,167 B2 | * | 3/2015 | Seki et al. | 399/208 |
| 2009/0234498 A1 | * | 9/2009 | Takahashi et al. | 700/230 |
| 2014/0334855 A1 | * | 11/2014 | Onishi et al. | 399/301 |
| 2015/0008097 A1 | * | 1/2015 | Andreoli et al. | 198/502.4 |

FOREIGN PATENT DOCUMENTS

JP    3344614 B2    11/2002
JP    4429895 B2    3/2010

\* cited by examiner

*Primary Examiner* — Leslie A Nicholson, III
*Assistant Examiner* — Keith R Campbell
(74) *Attorney, Agent, or Firm* — Canon USA, Inc. IP Division

(57) ABSTRACT

A speed detection apparatus includes a storage unit configured to store time when each of first and second sensors detects an arbitrary detection mark and an address corresponding to the detection mark. The speed detection apparatus further includes a same mark detection time identification unit configured to identify, based on output information from a reference speed detection unit, time when the first and second sensors detect the same mark, based on the address and the time stored in the storage unit, and a relative speed calculation unit configured to calculate, based on output information from the same mark detection time identification unit, a speed of the first sensor and the second sensor relative to a scale member.

7 Claims, 14 Drawing Sheets

FIG. 13
-- PRIOR ART --
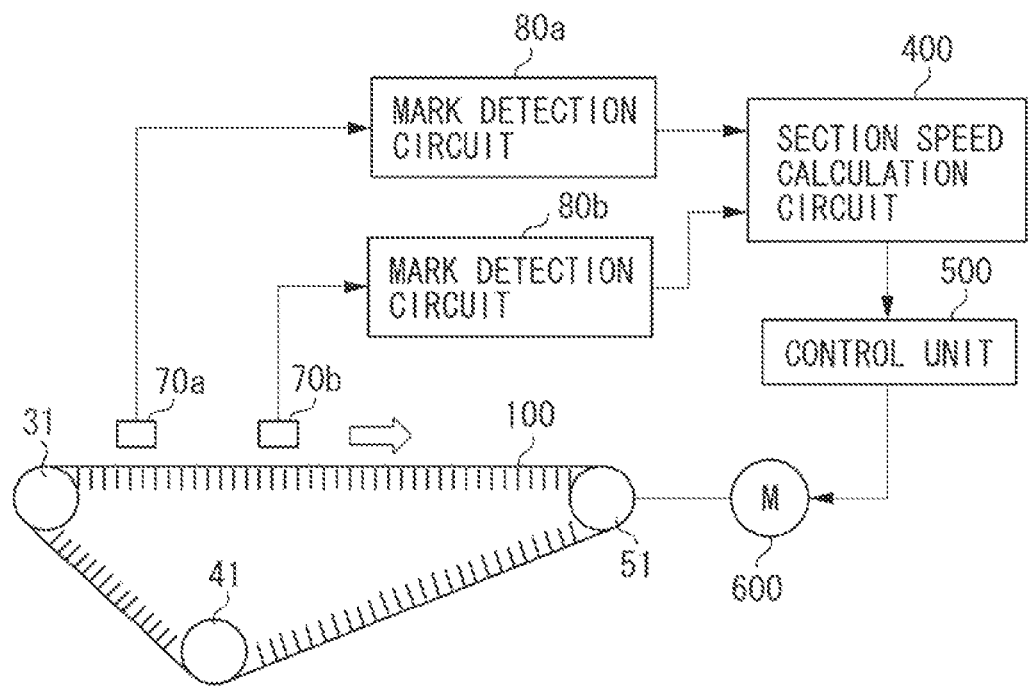
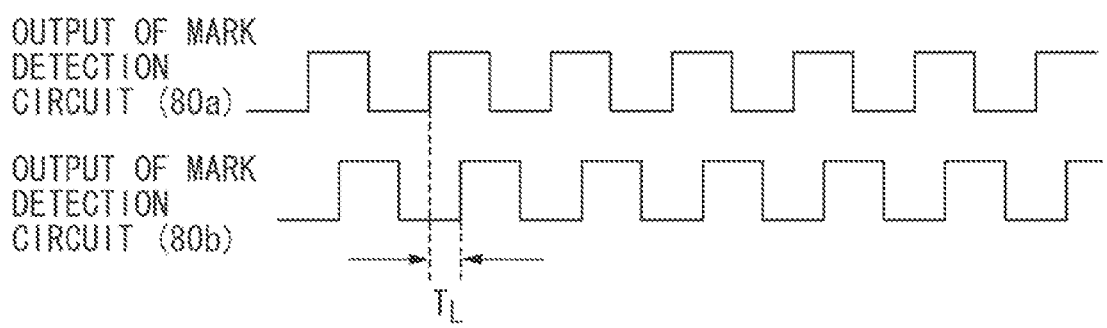

SPEED DETECTION APPARATUS AND DRIVING MECHANISM CONTROL APPARATUS

BACKGROUND OF THE INVENTION

1. Field of the Invention

One disclosed aspect of the embodiments relates to a speed detection apparatus that detects a detection mark, and a driving mechanism control apparatus that uses the speed detection apparatus.

2. Description of the Related Art

There have conventionally been offered a technology for highly accurately detecting a speed of a mobile object such as an intermediate transfer belt, and a technology for controlling the speed of the mobile object using the same. For example, there is known a method for attaching a scale member including a plurality of detection marks at constant pitches to the mobile object, detecting a signal from a sensor disposed oppositely to the mobile object, measuring periodical time of the marks based on the detected signal, and detecting the speed of the mobile object from the periodical time and the mark pitches. However, in this method, mark pitch accuracy on the mobile object exerts an influence on the measuring result, and a detection error becomes larger when the mark pitch accuracy becomes lower.

On the other hand, as a speed detection method (section speed detection method) which is not affected by the mark pitch accuracy, there is known a method for providing two sensors arranged in a relative moving direction. According to this speed detection method, a relative speed V is calculated by the following expression:

$$V = L/T_L$$

$T_L$: section time (time difference) required by the same detection mark to pass through the two sensors
L: predetermined distance between the sensors As illustrated in FIG. 13, signals are detected from first and second sensors 70a and 70b, and section time (time or hour difference, hereinafter time difference) $T_L$ between the two detected signals is measured to detect a speed. The use of this section speed detection method eliminates a detection error caused by pitch accuracy reduction of detection marks 200 on a mobile object 100 such as an intermediate transfer belt, thereby enabling accurate speed detection. FIG. 13 illustrates a driven roller 31, a secondary transfer upper roller 41, a driving roller 80a, a mark detection circuit 80b, a section time calculation circuit 400, and a control unit 500.

As such a section speed detection system, the following belt speed control apparatuses in copying machines have been offered.

The belt speed control apparatus discussed in Japanese Patent No. 3344614 includes a plurality of detection marks arranged at predetermined pitches on a belt surface and two optical sensors arranged with a distance equal to that between the marks. With this configuration, a time difference between time of detecting the detection mark by the front (upstream side in a mobile object moving direction) optical sensor and subsequent time of detecting the detection mark by the rear (downstream side in the mobile object moving direction) optical sensor is calculated. Further, a belt speed is detected based on the time difference. Thus, the belt speed is detected by measuring time required by the same detection mark to pass between the sensors during belt movement.

In the belt speed control apparatus discussed in Japanese Patent No. 4429895, time periods of N marks are integrated while a distance between two optical sensors is set as an integral multiple of a mark pitch interval, and then a belt speed is detected by calculating time required by the same mark to pass between the sensors during belt movement.

However, in the belt speed control apparatuses discussed in Japanese Patent Nos. 3344614 and 4429895, if there is a mark failure such as a joint, damage, or stain in the detection mark, a reflected light amount decreases to generate a mark detection error such as mark detection omission or detection period fluctuation. Consequently, it is difficult to detect an accurate belt speed.

Referring to FIG. 14, since mark detection omission occurs in one of the mark detection circuits 80a and 80b, the mark detection circuit 80b will be described. That is, as illustrated in FIG. 14, when a mark detection error occurs, a belt speed is detected based on a time difference $T_{NG}$ different from the time difference of the same mark in passing between the two sensors.

In other words, while the section time (time difference) $T_L$ as illustrated in FIG. 13 should be detected in the nature of things, several fold time difference $T_{NG}$ is detected. As a result, the detected belt speed is slower than an actual belt speed.

Thus, when belt control is performed by using the belt speed including such an error, an excessive driving force may be instructed during belt driving, creating a possibility of great fluctuation in belt speed. In such a case, a position of toner transferred to the mobile object 100 such as an intermediate transfer belt may be greatly shifted to cause distortion or color misregistration of an output image. Thus, there is a possibility that erroneous detection of a detected speed will greatly affect driving mechanism control.

In the technology discussed in Japanese Patent No. 4429895, as described above, the distance between the two sensors is an integral multiple of the mark pitch. According to this technology, in detection of the section speed at which the same mark passes between the sensors spaced from each other by a predetermined distance, the passing time difference of the same mark is measured. In the case of a distance relationship between two sensors in which a plurality of mark cycles is present, and the mark cycle, it is difficult to identify the same mark at the two sensors.

To identity the same mark, a method for identifying the same mark may be employed, which counts the number of mark cycles which are present between the two sensors, with one sensor during the movement, and detects the mark with the rear sensor (downstream sensor) based on the counted value.

However, particularly as discussed in Japanese Patent No. 4429895, when the detection mark is disposed in the flexible mobile object and the distance between the two sensors is the integral multiple of the mark pitch, the number of mark cycles between the two sensors changes due to a load change on the flexible object or a change in ambient temperature. As a result, an identification error of the same mark easily occurs, creating a possibility of erroneous detection of a section speed.

Even if the flexible object is a rigid object, when a film scale having a detection mark formed on a base material of a film is attached to the rigid object, there is a possibility of mark cycle unevenness which occurs due to elongation or contraction caused by load fluctuation during the attachment. In this case, similarly to the aforementioned case, an identification error of the same mark easily occurs, creating a possibility of erroneous detection of a section speed.

Further, when a mark detection error occurs due to a joint, damage, or stain in one of the two sensors, the same mark cannot be identified, thus creating a possibility of a speed detection error. As a result, in a driving mechanism control apparatus using this speed detection apparatus, control errors will increase.

SUMMARY OF THE INVENTION

According to an aspect of the embodiments, a speed detection apparatus includes a scale member including a plurality of detection marks continuously arranged at a predetermined pitch, first and second sensors spaced from each other by a predetermined distance larger than the predetermined pitch, and configured to detect the detection marks in a state of facing the detection marks and move relative to the scale member, a reference speed detection unit configured to detect a reference speed during movement of at least one of the first and second sensors relative to the scale member, a storage unit configured to store time when each of the first and second sensors detects an arbitrary detection mark, and an address corresponding to the detection mark, a same mark detection time identification unit configured to identify, based on output information of the reference speed detection unit, time when the first and second sensors detect the same mark, from the address and the time stored in the storage unit, and a relative speed calculation unit configured to calculate, based on output information of the same mark detection time identification unit, a of the first sensor and the second sensor relative to the scale member.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 13 is a block diagram illustrating conventional section speed detection and a conceptual diagram illustrating speed detection.

DESCRIPTION OF THE EMBODIMENTS

Various exemplary embodiments, features, and aspects of the disclosure will be described in detail below with reference to the drawings. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 8:
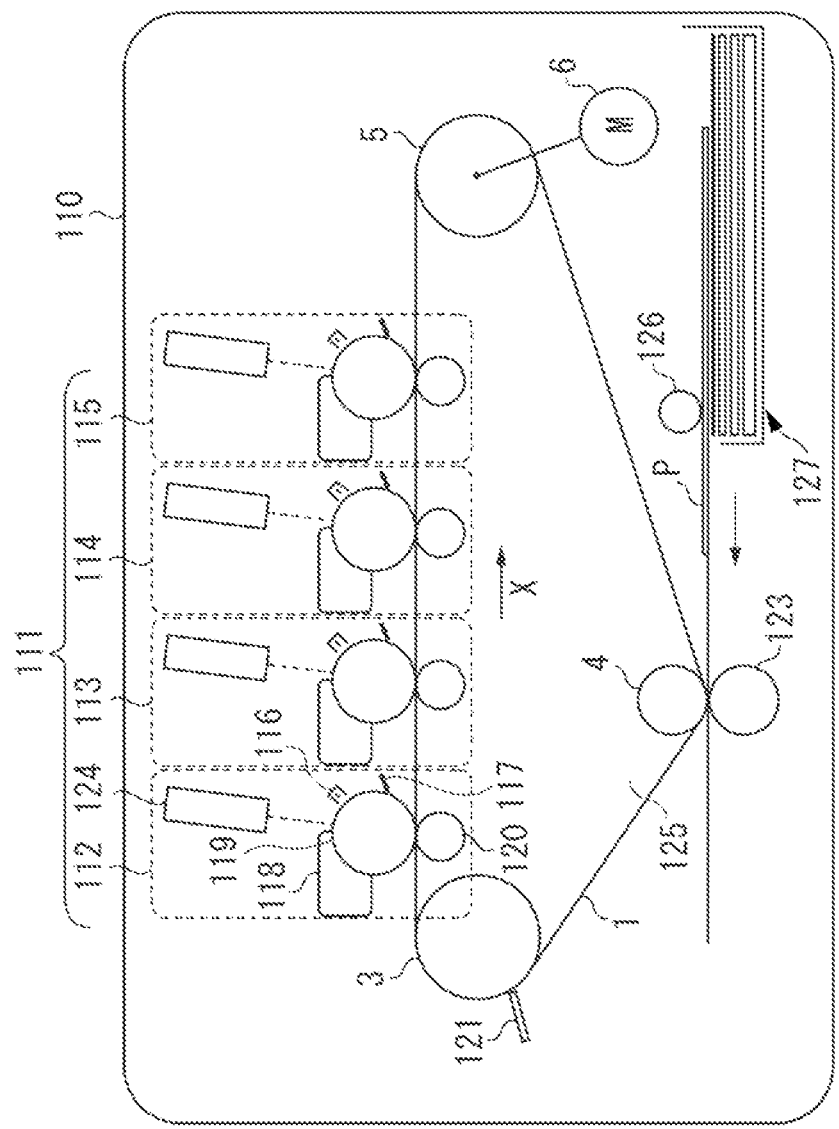
FIG. 8 is a sectional diagram illustrating an image forming apparatus.

Hereinafter, a speed detection apparatus and a driving mechanism control apparatus according to a first exemplary embodiment will be described referring to the drawings. Throughout the drawings, similar reference numerals denote similar or corresponding portions. FIG. 8 is a sectional diagram around an image forming unit in an image forming apparatus 110 of an electrophotographic method on which the speed detection apparatus and the driving mechanism control apparatus can be mounted. The image forming apparatus 110 performs an operation described below based on a control signal from a printer control interface (I/F) (not illustrated).

As illustrated in FIG. 8, the image forming apparatus 110 includes an image forming unit 111 that includes a magenta (M) image forming unit 112, a cyan (C) image forming unit 113, a yellow (Y) image forming unit 114, and a black (K) image forming unit 115.

The image forming units are all similar in configuration. Thus, the M image forming unit 112 will be described below in detail while omitting description of the other image forming units 113, 114, and 115. The configuration employs the four image forming units. However, the configuration is not limited to these four.

The M image forming unit 112 includes a photosensitive drum 119, a primary charging device 116, a drum cleaning blade 117, and a developing device 118. A latent image is formed on a surface of the photosensitive drum 119 by light from a laser scanner 124.

The primary charging device 116 charges the surface of the photosensitive drum 119 to prepare for latent image formation. The drum cleaning blade 117 scrapes off toner left on the photosensitive drum 119 after the end of transfer, and makes available the photosensitive drum 119 for use in next image formation. The developing device 118 develops the latent image on the photosensitive drum 119 to form a toner image. The developing device 118 includes a sleeve (not illustrated) for applying a developing bias to develop the image.

Next, a belt unit 125 including a mobile object 1 will be described. The belt unit 125 includes a driving roller 5 driven and rotated by a driving motor 6, a driven roller 3, and a secondary transfer upper roller 4, which constitute a suspension member to rotatably support the mobile object 1.

On a rear surface (inner peripheral surface) of the mobile object 1 such as an intermediate transfer belt, there is disposed a primary transfer roller 120 for applying a voltage from the rear surface of the mobile object to transfer a toner image formed on each photosensitive drum 119 to the mobile objet 1.

First, when the mobile object 1 is rotated to travel in an X direction by rotation of the driving roller 5, accordingly, the driven roller 3 and the secondary transfer upper roller 4 are taken along to rotate (rotate-driven). During this belt traveling, drawing of images is started sequentially at the image forming units 112, 113, 114, and 115 based on arbitrary output timing.

Then, on the mobile object 1, color images of magenta, cyan, yellow, and black are sequentially superimposed to be transferred (primary transfer), thereby forming one color image. Then, along with the traveling of the mobile object 1, the color image is fed to the secondary transfer unit between the secondary transfer upper roller 4 and a secondary transfer lower roller 123.

At the secondary transfer unit, the color image on the mobile object 1 is batch-transferred (secondary transfer) to a recording material P conveyed from a sheet feeding cassette 127 to a secondary transfer region by a pickup roller 126. In this case, waste toner left on the mobile object 1 without being transferred is removed by a cleaning blade 121 that is an abutting member to abut on the mobile object 1. Thus, the mobile object 1 is made available for use in next image formation.

The recording material P to which the color material has been secondary-transferred is fed to a fixing device (not illustrated) for a next step to perform image fixing processing (heating or pressurizing), and then discharged to a tray (not illustrated).

During such a series of image forming operations, a conveying speed of the mobile object 1 in the belt traveling direction X dynamically fluctuates due to an influence when the cleaning blade 121 or the recording material P enters secondary-transfer. As a result, there is a possibility that an image which is color-misregistered in the conveying direction will be output to the recording material P.

Figure 1:
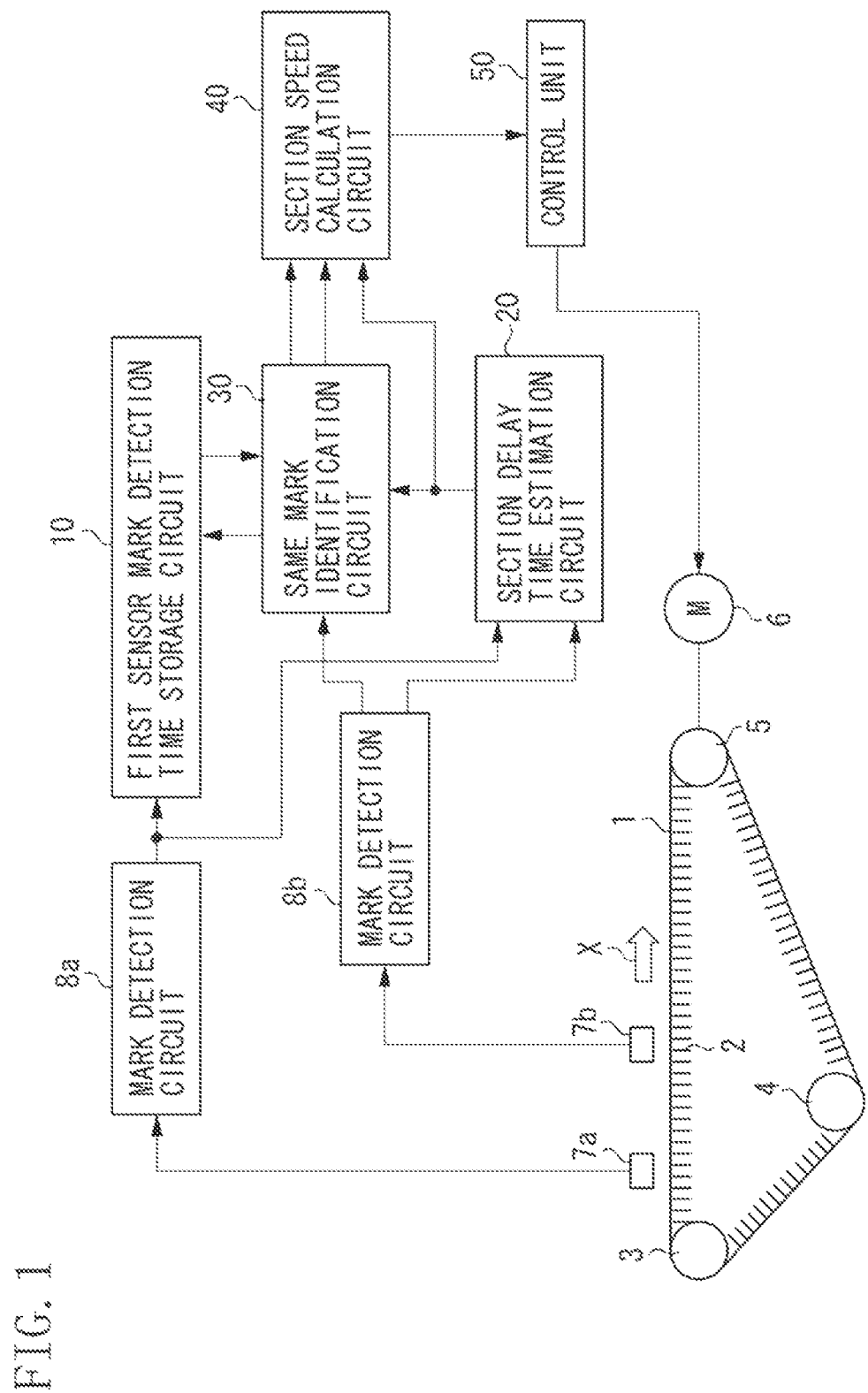
FIG. 1 is a schematic diagram illustrating a speed detection apparatus and a driving mechanism control apparatus according to a first exemplary embodiment.

Next, referring to FIG. 1, the speed detection apparatus and the driving mechanism control apparatus using the same in the image forming apparatus 110 according to the present exemplary embodiment will be described. FIG. 1 is a schematic diagram illustrating the speed detection apparatus and the driving mechanism control apparatus according to the present exemplary embodiment.

As illustrated in FIG. 1, first and second sensors 7a and 7b are arranged at positions with slight gaps from the endless beltlike mobile object 1. On the outer peripheral surface of the mobile object 1, a plurality of detection marks 2 is disposed at predetermined pitches (predetermined gaps or mark pitch distances) Pm (e.g., predetermined pitch Pm=500 µm) continuously in a belt rotational direction (mobile object moving direction).

The plurality of detection marks 2 is located outside an image forming region such as a peripheral edge which is unrelated to image formation on the mobile object 1. In FIG. 1, for convenience, the detection marks 2 are located in the inner peripheral surface of the mobile object 1. In reality, however, the detection marks 2 are located in the outer peripheral surface of the mobile object 1 as described above.

In the present exemplary embodiment, the plurality of detection marks 2 is formed on a thin tape resin as the scale member, and the scale member has a plurality of detection marks continuous at predetermined pitches Pm (mark pitch distance). This scale member is attached to the entire periphery (entire periphery of the belt outer peripheral surface) of the mobile object 1.

The detection marks 2 can also be formed in the entire periphery of the inner peripheral surface of the mobile object 1. In such a case, the first and second sensors 7a and 7b are arranged on the inner peripheral surface side of the mobile object 1. As the scale member, the detection marks 2 can be directly formed in the mobile object 1.

The image forming apparatus 110 of the present exemplary embodiment can be configured as a color image forming apparatus such as a copying machine, a laser beam printer (LBP), or an ink jet printer. In the image forming apparatus 110, toner images of four colors are formed on the respective photosensitive drums 119 by an exposure device and the developing device, and the four-color images are sequentially superimposed on the mobile object 1 that is the intermediate transfer belt (intermediate transfer member) to obtain a color image. To prevent image distortion or color misregistration, the surface of the photosensitive drum or the intermediate transfer belt must be under highly accurate driving control.

In the case of such an image forming apparatus 110, the image is formed on the endless beltlike mobile object 1, and thus the detection marks 2 are arranged outside the image forming region. The outside of the image forming region can be the outside of a region in a width direction with respect to a belt moving direction, or a rear surface, and there is no particular limitation as long as it is outside the image forming region.

The driven roller 3 and the secondary transfer upper roller 4 rotate along with the mobile object 1 following the rotational movement of the mobile object 1. In the present exemplary embodiment, a pulse motor is used as the driving motor 6 for driving the driving roller 5, and rotation control is performed based on a pulse signal from the control unit 50. Owing to rotation of the driving roller 5 driven by the driving motor 6, the mobile object 1 rotates and moves in the arrow direction X.

It is in practice impossible to set eccentricity of the driving roller 5 to zero. Even if the driving roller 5 has been under driving control of the driving roller 6 at a constant rotation speed, a surface speed of the driving roller 5 changes due to the driving roller eccentricity. Thus, the speed detection apparatus of the present exemplary embodiment is mainly directed to detection of a speed change of the mobile object 1 caused by the driving roller eccentricity and detection of a speed change dependent on an effective change in a driving roller diameter caused by an uneven thickness of the mobile object 1.

The speed detection apparatus and the driving mechanism control apparatus according to the present exemplary embodiment include the first sensors 7a and 7b, mark detection circuits 8a and 8b, a first sensor mark detection time storage processing circuit 10, and a section delay time estimation circuit 20. The speed detection apparatus and the driving mechanism control apparatus further include a same mark identification circuit 30, a section speed calculation circuit 40, the control unit 50, and the driving motor 6.

The first and second sensors 7a and 7b, which are configured to read (detect) the detection marks 2, are arranged with slight gaps upward from the mobile object 1 on the upstream side and the downstream side along the moving direction of the mobile object 1. The first sensor 7a on the upstream side and the second sensor 7b on the downstream side 7b are spaced from each other by a predetermined distance L (e.g., 10 mm) to be arranged at positions where the detection marks 2 can be detected during the movement of the mobile object 1. In the present exemplary embodiment, optical sensors are used in the first and second sensors 7a and 7b.

Specifically, the first and second sensors 7a and 7b are spaced from each other by the predetermined distance L which is larger than a predetermined gap (predetermined pitch) between the detection marks 2, detect the detection marks 2 in the state of facing the detection marks 2, and move relative to the scale member. In the present exemplary embodiment, the speed of the scale member moving relative to the first and second sensors 7a and 7b which are fixed to the apparatus body side is detected. However, this relationship can be reversed. In other words, the speeds of the first and second sensors 7a and 7b moving relative to the fixed scale member can be detected. This also applies to a second exemplary embodiment described below.

The optical sensor basically includes a light source and a light reception sensor. For example, when the light source is a light emitting diode (LED), light from the LED light source is applied to the detection mark 2 structured such that reflection parts and nonreflection parts are repeatedly arranged at constant pitches (predetermined pitches), and its reflected light is detected by the light reception sensor. Further, an output based on the reflected light detected by the light reception sensor is received by the mark detection circuits 8a and 8b to perform binarization processing.

The binarized output of the mark detection circuit 8a is received, after mark detection time is identified by a timer latch, by the first sensor mark detection time storage processing circuit 10 and the section delay time estimation circuit 20. The output of the mark detection circuit 8a thus received is used for storing time of the first sensor 7a concerning setting of section time and calculating a belt reference speed to estimate section time.

The first sensor mark detection time storage processing circuit 10 constitutes a reference speed detection unit configured to detect a reference speed during the relative movement of at least one of the first and second sensors 7a and 7b and the scale member. This reference speed detection unit detects the reference speed based on mark cycle detection time of the detection marks 2 obtained by at least one of the first and second sensors 7a and 7b and the predetermined distance between the first sensor 7a and the second sensor 7b.

The first sensor mark detection time storage processing circuit 10 as the reference speed detection unit averages and uses a reference speed detected by using the first sensor 7a and a reference speed detected by using the second sensor 7b when detecting the reference speed (rough speed) by using both the first and second sensors 7a and 7b.

The binarized output of the mark detection circuit 8b is, as in the case of the mark detection circuit 8a, input to the section delay time estimation circuit 20 and the same mark identification circuit 30.

The section delay time estimation circuit 20 calculates a belt reference speed based on the input mark detection time information and the input mark cycle information from the first and second sensors 7a and 7b. Then, based on the belt reference speed and the predetermined distance L between the first and second sensors 7a and 7b, an estimated value of time required by one detection mark 2 to pass between the two sensor sections, i.e., an estimated value of section delay time, is calculated. The section delay time estimation circuit 20 outputs, after the same mark has been identified by the same mark identification circuit 30, section delay time adopted immediately before the identification.

The same mark identification circuit 30 calculates an estimated value of sensor mark detection time based on the section delay time estimation value output from the section delay time estimation circuit 20 and the mark detection time of the second sensor 7b. The same mark identification circuit 30 then identifies, in the information stored in the first sensor mark detection time storage processing circuit 10, a detection mark 2 which seems the most surely the same mark, and outputs the detection time of the first and second sensors 7a and 7b to the section speed calculation circuit 40.

The section delay time estimation circuit 20 and the same mark identification circuit 30 constitute a same mark detection time identification unit. The same mark detection time identification unit identifies, based on output information of the processing circuit (reference speed detection unit) 10, time when the same mark is detected by the first and second sensors 7a and 7b, according to an address and time stored in a timer value memory (storage unit) 102 illustrated in FIG. 4.

The section speed calculation circuit 40 calculates a speed of the mobile object 1 based on a detection time difference and the predetermined distance (inter-sensor distance) L between the first and second sensors 7a and 7b, and outputs the speed of the mobile object 1 to the control unit 50. The control unit 50 controls the driving motor 6 based on output information from the section speed calculation circuit 40.

The section speed calculation circuit 40 serving as a relative speed calculation unit compares the output information of the section delay time estimation circuit 20 with the output information of the same mark detection time difference identified by the same mark identification circuit 30, with a section detection time abnormality determination circuit 401. Then, a section time interpolation processing circuit 402 serving as an interpolation processing unit interpolates (corrects) section time based on a determination result of the section detection time abnormality determination circuit 401, and calculates a reference speed (relative speed) based on an interpolation result.

The section speed calculation circuit 40 constitutes a relative speed calculation unit that calculates a relative speed of the first and second sensors 7a and 7b and the scale member based on the output information of the same mark detection time identification unit including the section delay time estimation circuit 20 and the same mark identification circuit 30.

The section detection time abnormality determination circuit 401 is an abnormality determination unit that determines presence of abnormality based on determination as to whether the relative speed calculated by the relative speed calculation unit is within a threshold value. The section time interpolation processing circuit 402 is an interpolation unit that performs, when the section detection time abnormality determination circuit 401 as the abnormality determination unit determines that there is abnormality, interpolation processing on a section time $T_L$ value (interpolation processing for relative speed) and outputs its result.

Figure 2:
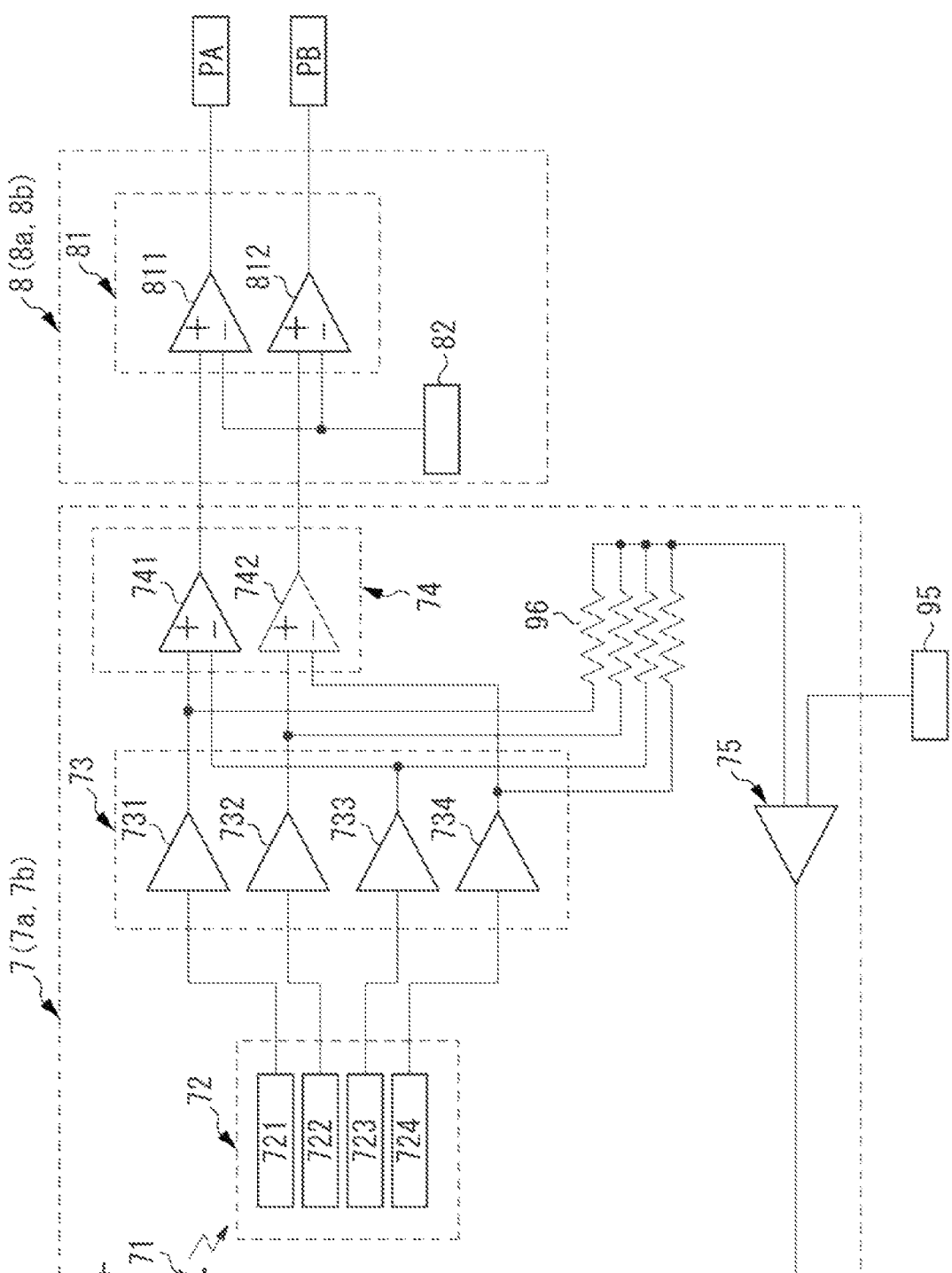
FIG. 2 is a block diagram illustrating a sensor and a mark detection circuit according to the first exemplary embodiment.

FIG. 2 illustrates a detailed configuration of the first and second sensors 7a and 7b and the mark detection circuits 8a and 8b in the speed detection apparatus and the driving mechanism control apparatus. FIG. 2 illustrates one of the similarly configured first and second sensors 7a and 7b and one of the similarly configured mark detection circuits 8a and 8b. In reality, they are used two by two.

The first and second sensors 7a and 7b are similar in configuration, and configured as illustrated in a broken line 7 (7a and 7b) in FIG. 2. In the first and second sensors 7a and 7b, as illustrated in FIG. 2, a LED 71 and a photodiode array 72 (hereinafter, referred to as photodiode arrays 721 to 724) constitute a light source and a light reception unit, respectively. Light emitted from the LED 71 and reflected by the detection mark 2 of the mobile object 1 is received by the photodiode array 72 (721 to 724).

An operation of the LED 71 illustrated in FIG. 2 will be described. A certain plus voltage is applied to an anode side of the LED 71, while an output of a differential amplifier 75 is connected to a cathode side of the LED 71. A target voltage Tgt (=reference light amount) 95 and detection voltages (=received light amounts) transmitted via each resistor 96 corresponding to current-voltage conversion amplifiers 731 to 734 included in a current-voltage conversion amplifier 73 are connected to the differential amplifier 75.

With this circuit configuration, when the detection voltage (=received light amount) is small (=small received light amount), a minus voltage is applied to the cathode of the differential amplifier 75, and a voltage applied to the anode of the LED 71 increases to intensify light emission. On the other hand, when the detection voltage is large (=large received light amount), a plus voltage is applied to the cathode of the differential amplifier 75, and the voltage applied to the anode of the LED 71 decreases to weaken light emission.

By this operation, a light amount input to the photodiode array 72 (721 to 724) is subjected to feedback control to become constant, by the differential amplifier 75.

Each interval between the photodiode arrays 721 to 724 is set roughly to optical magnification/4 [times] a predetermined pitch Pm of the detection marks 2 which are periodically arranged on the mobile object 1. For example, when a diffused-light-flux light source LED is used, and a reciprocating ratio of a distance from the LED 71 as a light source to the mobile object 1, to a distance from the mobile object 1 to the photodiode array 72 is 1:1, image magnification on the photodiode 72 doubles. Thus, also an interval between the detection marks 2 on the photodiode array 72 doubles.

In the present exemplary embodiment, the cycle is divided into four. Accordingly, the space concerning the photodiode arrays 721 to 724 shows optical magnification/4 [times] the mark cycle on the mobile object 1, i.e., ½ [times].

Detection cycle signals of the photodiode arrays 721 and 724 and the photodiode arrays 722 and 724 are in a phase relationship of 180° with respect to the detection cycle of the detection marks 2. Detection cycle signals of the photodiode arrays 721 and 722 and the photodiode arrays 723 and 724 are in a phase relationship of 90°.

Outputs of the photodiode arrays 721 to 724 are converted into voltage outputs at the current-voltage conversion amplifier 73 (hereinafter, also referred to as current-voltage conversion amplifiers 731 to 734). Further, outputs of the current-voltage conversion amplifiers 731 and 733 which are different by 180° in phase from each other are output as a differential output of a predetermined reference voltage by the differential amplifier 741 of the differential amplifier circuit 74. Similarly, outputs of the current-voltage conversion amplifiers 732 and 734 are output as a differential output of the predetermined reference voltage by the differential amplifier 742.

Accordingly, a direct-current (DC) voltage output corresponding to an in-phase noise and a DC light component is removed. As a result, the outputs of the differential amplifiers 741 and 742 of the differential amplifier circuit 74 become pseudo-sine waves which are different from each other by 90° in phase centering around the reference voltage.

The mark detection circuits 8a and 8b, which are similar in configuration, are illustrated within a broken line 8 in FIG. 2. The mark detection circuits 8a and 8b receive the outputs of the differential amplifiers 741 and 742 to comparators 811 and 812, and compare them with a comparison voltage 82 to obtain binarized outputs of signals PA and PB which are different from each other by 90° in phase.

Figure 3:
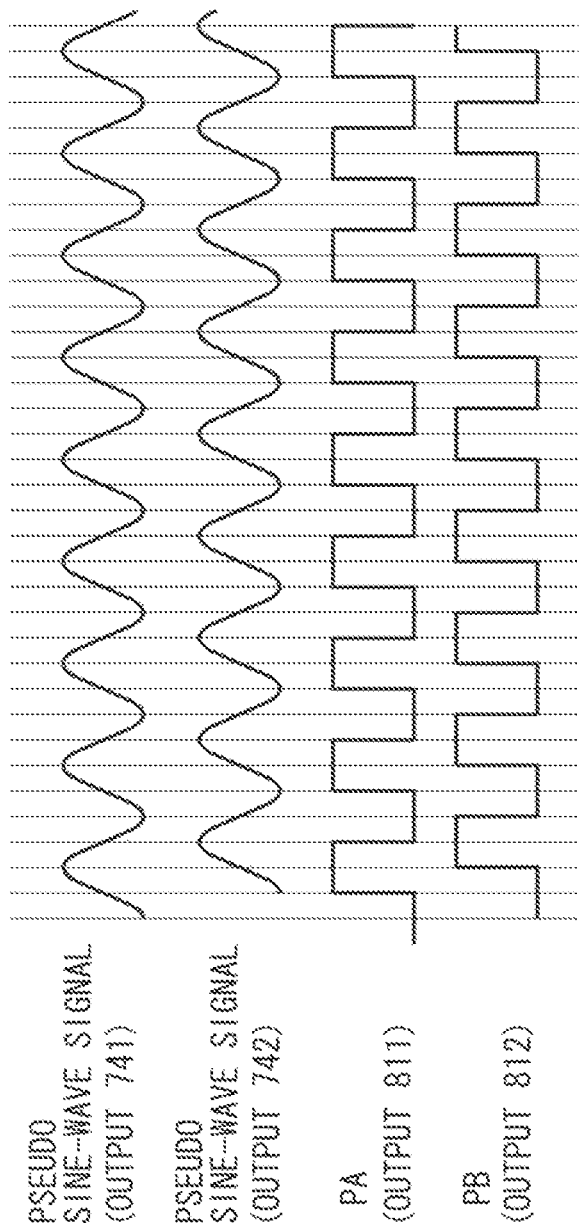
FIG. 3 is a diagram illustrating output waveforms of the sensor and the mark detection circuit according to the first exemplary embodiment.

FIG. 3 illustrates the pseudo-sine waves that are outputs of the differential amplifiers 741 and 742 and the signals PA and PB that are outputs (binarized outputs) of binarized output waves of the comparators 811 and 812.

Figure 4:
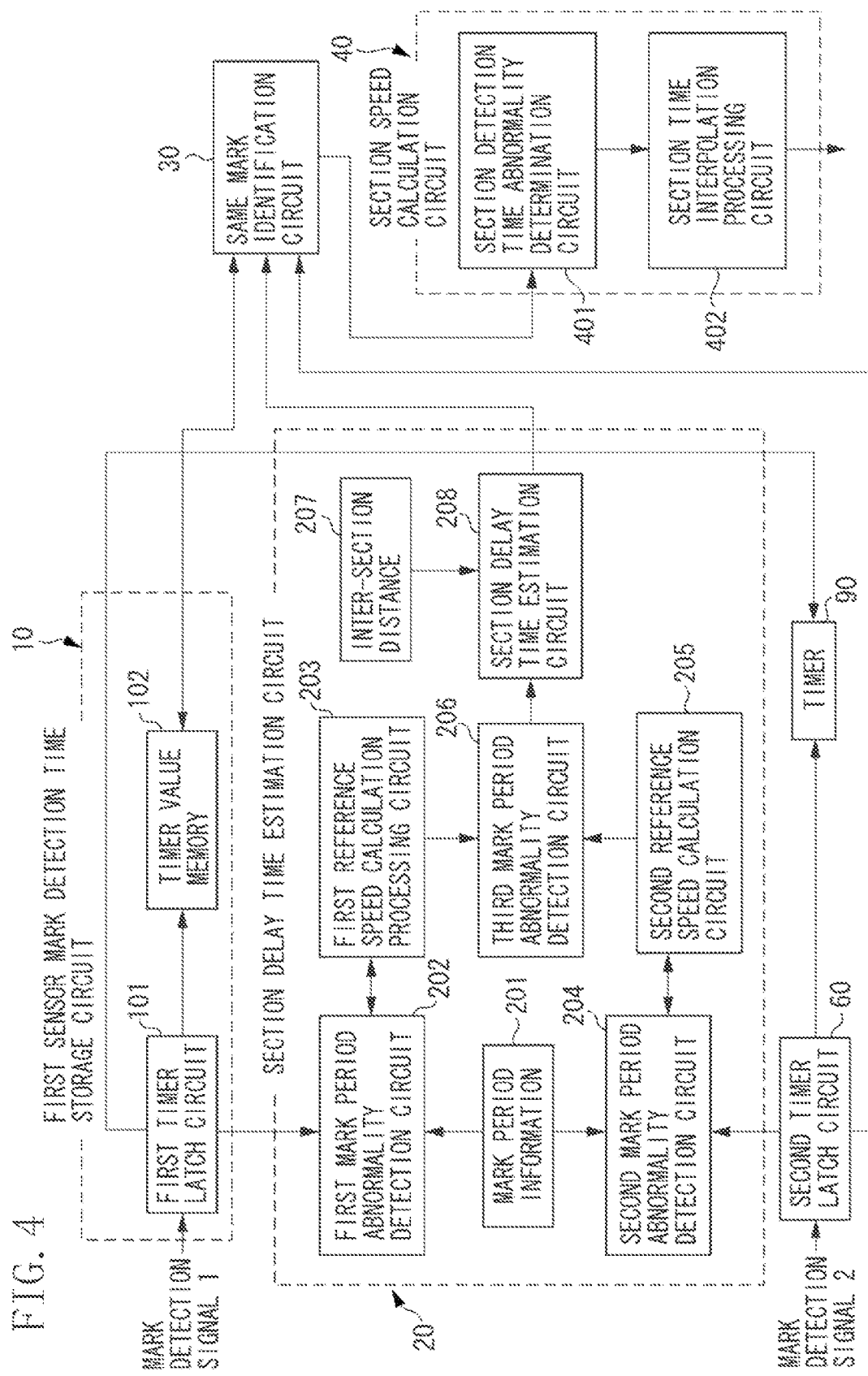
FIG. 4 is a block diagram illustrating the speed detection apparatus according to the first exemplary embodiment.

Next, a processing operation will be described referring to FIG. 4 that is a detailed block diagram illustrating the first sensor mark detection time storage processing circuit 10, the section delay time estimation circuit 20, the same mark identification circuit 30, and the section speed calculation circuit 40 illustrated in FIG. 1.

The first sensor mark detection time storage processing circuit 10 includes a first timer latch circuit 101 and a timer value memory 102.

The section delay time estimation circuit 20 includes a first mark cycle abnormality detection circuit 202, a second mark cycle abnormality detection circuit 204, a first reference speed calculation processing circuit 203, a second reference speed calculation processing circuit 205, a third reference speed calculation processing circuit 206, and a section delay time estimation processing circuit 208.

The section speed calculation circuit 40 includes a section detection time abnormality determination circuit 401 and a section time interpolation processing circuit 402.

A timer 90 is a timer for continuing counting-up by a not shown clock (100 MHz in the present exemplary embodiment).

The first sensor mark detection time storage processing circuit 10 receives a mark detection signal 1 via the mark detection circuit 8a from the first sensor 7a that first detects the detection mark 2 in the moving direction of the mobile object 1. Then, the first sensor mark detection time storage processing circuit 10 outputs mark detection time of the first sensor 7a to perform storage processing.

As the mark detection signal 1, a binarized mark detection signal obtained by the mark detection circuit 8a which binarizes the mark detection signal 1 detected in the first sensor 7a is used. In the present exemplary embodiment, the signal PA that is output from the comparator 811 illustrated in FIG. 2 is used.

The first sensor mark detection time storage processing circuit 10 latches a rising edge of the mark detection signal 1 as a timer count value of the timer 90 in the first timer latch circuit 101.

The timer count value latched by the first sensor mark detection time storage processing circuit 10 is stored in the timer value memory 102. A size of the timer value memory 102 only needs to be equal to or more than the number of marks in the space between the two sensors. In the present exemplary embodiment, since the number of marks present in the space between the two sensors is about 20 (≈10 mm/0.5 mm), the size needs to be equal to or more than this number. The timer value memory 102 stores timer count values in detection order.

Simultaneously, the first mark cycle abnormality detection circuit 202 of the section delay time estimation circuit 20 performs mark cycle measurement of the mark detection signal 1 by the clock and its abnormality determination. In the abnormality determination, the first mark cycle abnormality detection circuit 202 determines whether the measured mark detection period time is within predetermined time. Based on this determination information and mark cycle information 201, the first reference speed calculation processing circuit 203 performs calculation processing of a first reference speed.

The section delay time estimation circuit 20 performs similar processing on a mark detection signal 2 in the second mark cycle abnormality detection circuit 204. Specifically, the mark detection signal 2 is received via the mark detection circuit 8b from the second sensor 7b. The second sensor 7b subsequently detects the detection mark 2 in the moving direction of the mobile object 1. Then, the section delay time estimation circuit 20 outputs mark detection time of the second sensor 7b to the second mark cycle abnormality detection circuit 204. The second mark cycle abnormality detection circuit 204 performs mark cycle time measurement and its abnormality determination. Based on this determination information and the mark cycle information 201, the second reference speed calculation processing circuit 205 performs calculation processing on a second reference speed.

The calculation processing of the belt reference speed is performed based on an average value of a predetermined number of detection mark cycle times and an actual value of the predetermined pitch Pm. In this case, an error of a detection mark cycle or omission of mark detection caused by dust or the like is removed from an average value calculation target, when the abnormality determination determines that there is abnormality, because it causes an error of a belt reference speed, which deteriorates accuracy of section delay estimation time. There is no particular limitation on a removing method. However, when the presence of abnormality is determined, a last value may be used instead, or the number of average values may be reduced.

As the number for average value calculation, desirably, a frequency component (band) of a detected speed is matched with that of a section detection speed, in other words, an average of mark frequencies in the space between the two sensors. In this case, an average value of 20 is set as described above.

Concerning a threshold value for pulse abnormality determination, to accurately identify marks in section detection, a rough speed error during the average value calculation must be set within an error of ±½ [pieces] of mark identification in section detection, i.e., within accuracy of at least a ¹⁄₂₀ section length error. Further, a threshold value obtained by adding an actual value of mark cycle accuracy must be set.

As described above, in the calculation processing of the reference speed, the averaging processing is carried out by removing the abnormality determination of the detection mark cycle time, and the average speed is calculated from this value and the mark pitch interval. Further, since similar processing can be performed on the mark detection signals 1 and 2, these individual processes are respectively performed in the first reference speed calculation processing circuit 203 and the second reference speed calculation processing circuit 205. Finally, these average values are further subjected to averaging processing in the third reference speed calculation processing circuit 206 to calculate a final belt reference speed.

As described above, the reference speed calculation processing using the mark detection signals 1 and 2 is performed in the first reference speed calculation processing circuit 203 and the second reference speed calculation processing circuit 205, and the averaging processing is further performed in the third reference speed calculation processing circuit 206. Thus, the reference speed calculation can be performed with higher accuracy.

In the present exemplary embodiment, in the reference speed detection, the calculation is performed based on the pulse period of the signal PA of the mark detection circuit 8b. However, a speed detection method other than the mark cycle time detection can be used. An example is a time difference between a PA output and a PB output having a phase difference of 90° with respect to the output cycle of the signals PA and PB that are binarized outputs of the mark detection circuits 8a and 8b.

In the above description, only the pulse cycle of the signal PA of the mark detection circuit 8b has been used. However, when the reference speed is detected by using a plurality thereof, accuracy of the reference speed can be enhanced by an averaging effect of pitch errors.

When the time difference between the PA output and the PB output having the phase difference of 90°, the number for average value calculations may be optimized based on the aforementioned idea. These may be determined based on a relationship between a processing load or a circuit load and necessary reference speed accuracy. When priority is on reduction of the processing load, implementation of the disclosure which is limited to one of the mark detection signal 1 and the mark detection signal 2 is not outside the disclosure.

In the present exemplary embodiment, the reference speed is calculated by measuring the mark cycle time on the mobile object 1. However, depending on the accuracy of the reference speed, a rotational speed of the driving roller 5 for driving the mobile objet 1 can be detected, and a reference speed of the mobile object 1 can be obtained from the rotational speed and applied as an exemplary embodiment.

After the belt reference speed has been obtained, the section delay time estimation circuit 20 calculates, by the following expression, section delay estimation time from the belt reference speed and a distance 207 (predetermined distance L) between the two sensors in the section delay time estimation processing circuit 208: section delay time estimation time=inter-sensor distance (L)/belt reference speed To improve the estimation accuracy of the section delay time, the belt reference speed may be changed to a section speed detection result after a passage of predetermined time, and a section speed immediately before section speed updating may be switched to be a referenced speed. In such a case, desirably, during a period until a belt conveying speed is stabilized, section delay time is estimated by using the mark detection periods or the phase difference of the mark detection circuits 8a and 8b. After the speed has been stabilized, section delay time is estimated based on the result of the section speed detection.

The same mark identification circuit 30 calculates an estimated value of a detected timer value 1 of the first sensor 7a based on a detected timer value 2 of the mark detection signal 2 received from the second sensor 7b and the section delay time received from the section delay time estimation circuit 20. Then, the same mark identification circuit 30 identifies the detection timer value 1 of the same mark in the timer value memory 102 to output the respective timer values 1 and 2. For the mark detection signal 2, a detection signal similar to the mark detection signal 1, for example, the signal PA, is used.

The timer value memory 102 constitutes a storage unit that stores time (detection timer values 1 and 2) of detecting an arbitrary detection mark 2 by each of the first and second sensors 7a and 7b and an address (not illustrated) corresponding to the detection mark 2.

Figure 5:
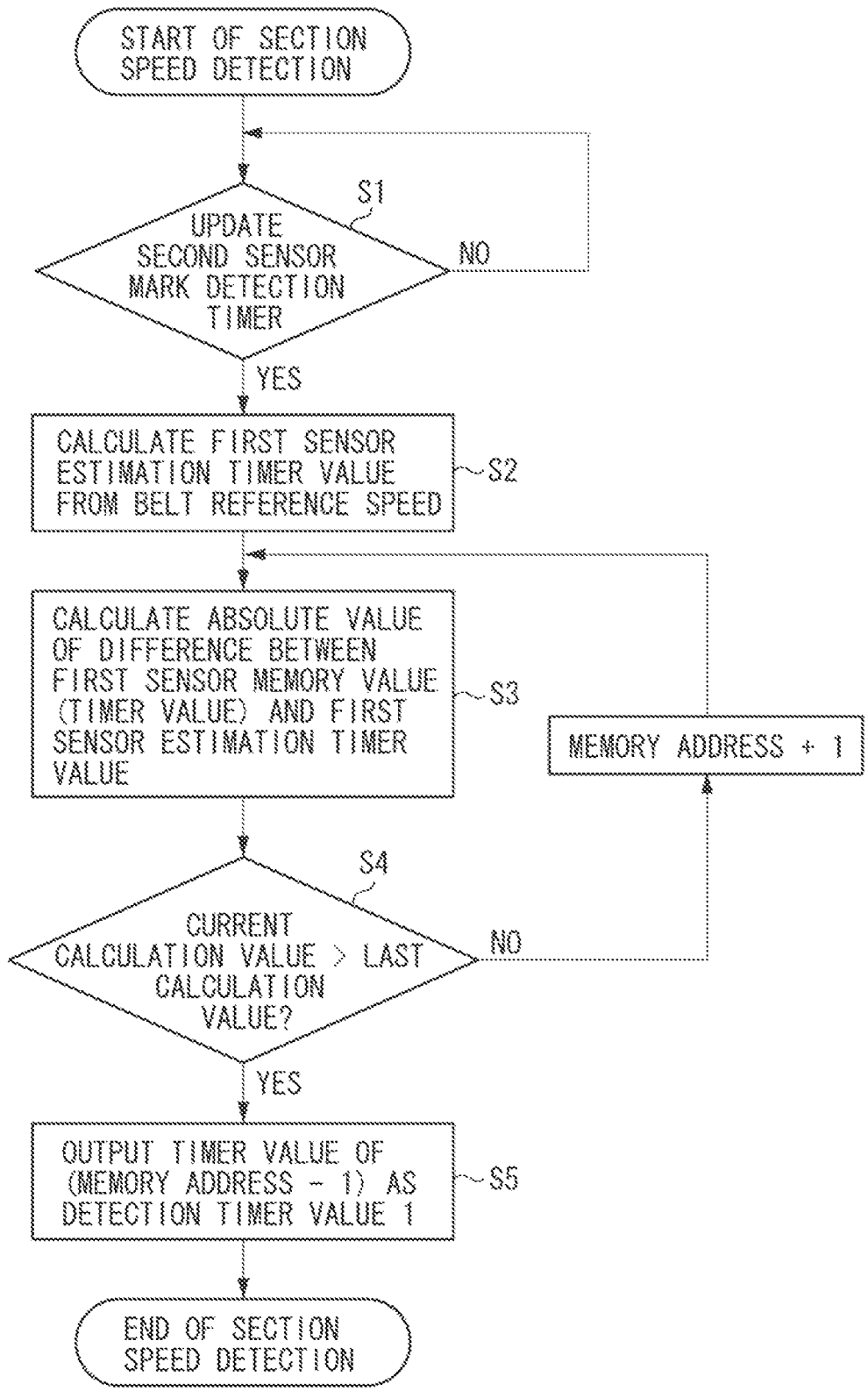
FIG. 5 is a sequential diagram illustrating searching for the same mark according to the first exemplary embodiment.

A same mark identification sequence performed by the same mark identification circuit 30 will be described referring to FIG. 5.

Specifically, when section speed detection is started, in step S1, acquisition update of the timer value 2 latched by the mark detection signal 2 is determined by using the mark detection signal 2 similar in type or polarity to the mark detection signal 1 of the first sensor 7a obtained by latching the timer value 1 during the section speed detection.

In step S2, when acquisition update of the timer value 2 is performed, the section delay time estimation circuit 20 calculates a first sensor estimation timer value based on a belt reference speed of this time.

Then, based on a search address, a timer value of the first sensor 7a is obtained from the timer value memory 102. In step S3, an absolute value of a difference between the first sensor memory value (timer value) and the first sensor estimation timer value is calculated.

In step S4, searching for an address where a difference absolute value is smallest is carried out. A present calculated value is compared with a last calculation value (calculation value of address−1) to identify an address where the present calculation value is larger than the last calculation value. While present calculation value >last calculation value is not satisfied, the memory address is incremented by 1 to repeat the processing of step S3.

In step S5, since the identified timer value of "memory address−1" is the address where the difference absolute value is smallest, the timer value of the first sensor 7a of the address is output as a detection timer value 1 from the same mark identification circuit 30.

By repeating the same sequence during the section speed detection for each acquisition update of the timer value 2 latched based on the mark detection signal 2, a mark identification operation is always performed during the section speed detection.

Figure 6:
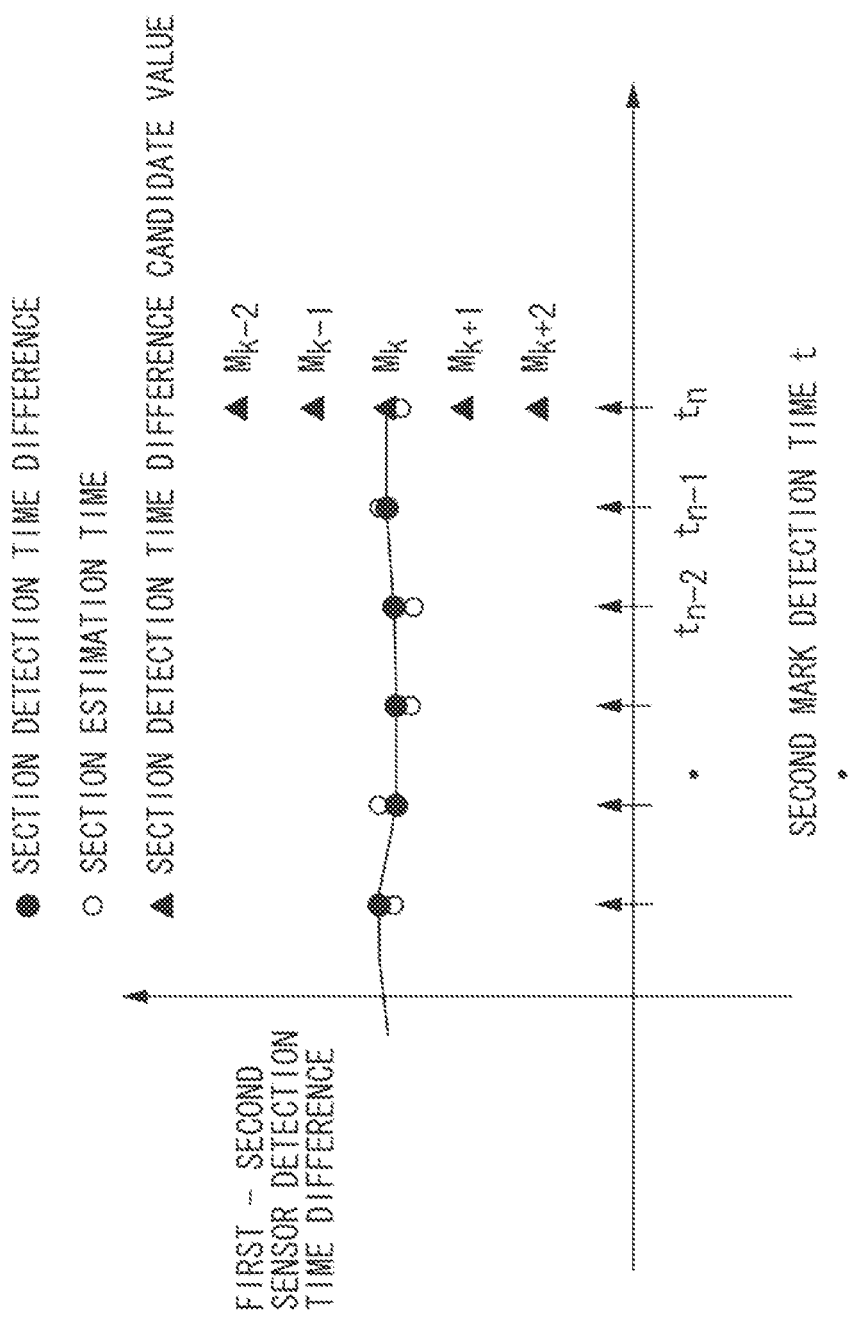
FIG. 6 is a conceptual diagram illustrating searching for the same mark according to the first exemplary embodiment.

FIG. 6 is a conceptual diagram of the same mark identification sequence. A horizontal axis illustrated in FIG. 6 indicates time t when the detection mark 2 is detected by the second sensor 7b and the timer value 2 is updated, detection time being indicated by an arrow. A vertical axis indicates a detection time difference between the first sensor 7a and the second sensor 7b, i.e., a timer value difference, which is information about a speed.

In FIG. 6, a black circle indicates determined section time. A white circle indicates section estimation time of a time difference calculated between the first sensor 7a and the second sensor 7b from the reference speed. A black triangle indicates a difference value from a plurality of memory values (Mk: k is address value) of the mark detection timer value of the first sensor 7a at mark detection time to of the second sensor 7b, which is a candidate value of the section detection time difference.

In the mark identification sequence according to the present exemplary embodiment, based on the section estimation time indicated by the white circle, surest first mark detection time is identified from among the plurality of timer memory values (Mk) indicated by the black triangles.

Next, an operation of the section speed calculation circuit 40 illustrated in FIGS. 1 and 4 will be described. The section speed calculation circuit 40 includes the section detection time abnormality determination circuit 401 and the section time interpolation processing circuit 402. The section speed calculation circuit 40 calculates a section speed based on two outputs received from the same mark identification circuit 30, i.e., the detection timer value 1 and the detection timer value 2, and the section delay estimation time received from the section delay time estimation circuit 20k to output it to the control unit 50.

First, a time difference of the same mark in passing between the two sensors, i.e., section time $T_L$, is calculated from the detection timer value 1 and the detection timer value 2.

First, the section detection time abnormality determination circuit 401 calculates a difference between the section time TL and the section delay estimation time output from the section delay time estimation circuit 20, and performs abnormality determination based on whether the calculation result is within predetermined time. It is desirable that an upper limit of a threshold value of the abnormality determination is ±1/2 of the mark detection period, accuracy of a calculated reference speed is considered, and a narrower range is set.

Then, the section time interpolation processing circuit 402 performs interpolation processing based on the abnormality determination result. When the abnormality determination result is that there is no abnormality, the section time $T_L$ value which is a difference calculated from the detection timer value 1 and the detection timer value 2, is directly output as a section time value. On the other hand, when the abnormality determination result is that there is abnormality, the section time $T_L$ value is subjected to interpolation processing to determine an output value. In the interpolation processing, an average value among section detection times within predetermined time may be output, or last section detection time may be maintained.

The abnormality determination processing and the interpolation processing can be similarly applied to a second exemplary embodiment described below.

A speed is calculated from the detected section time obtained as a result of the section time abnormality determination and the interpolation processing in the case of abnormality, and the distance (predetermined distance L) between the two sensors is output to the control unit 50. While the speed is output to the control unit 50 according to the present exemplary embodiment, the calculated section time may be output as it is.

Figure 7:
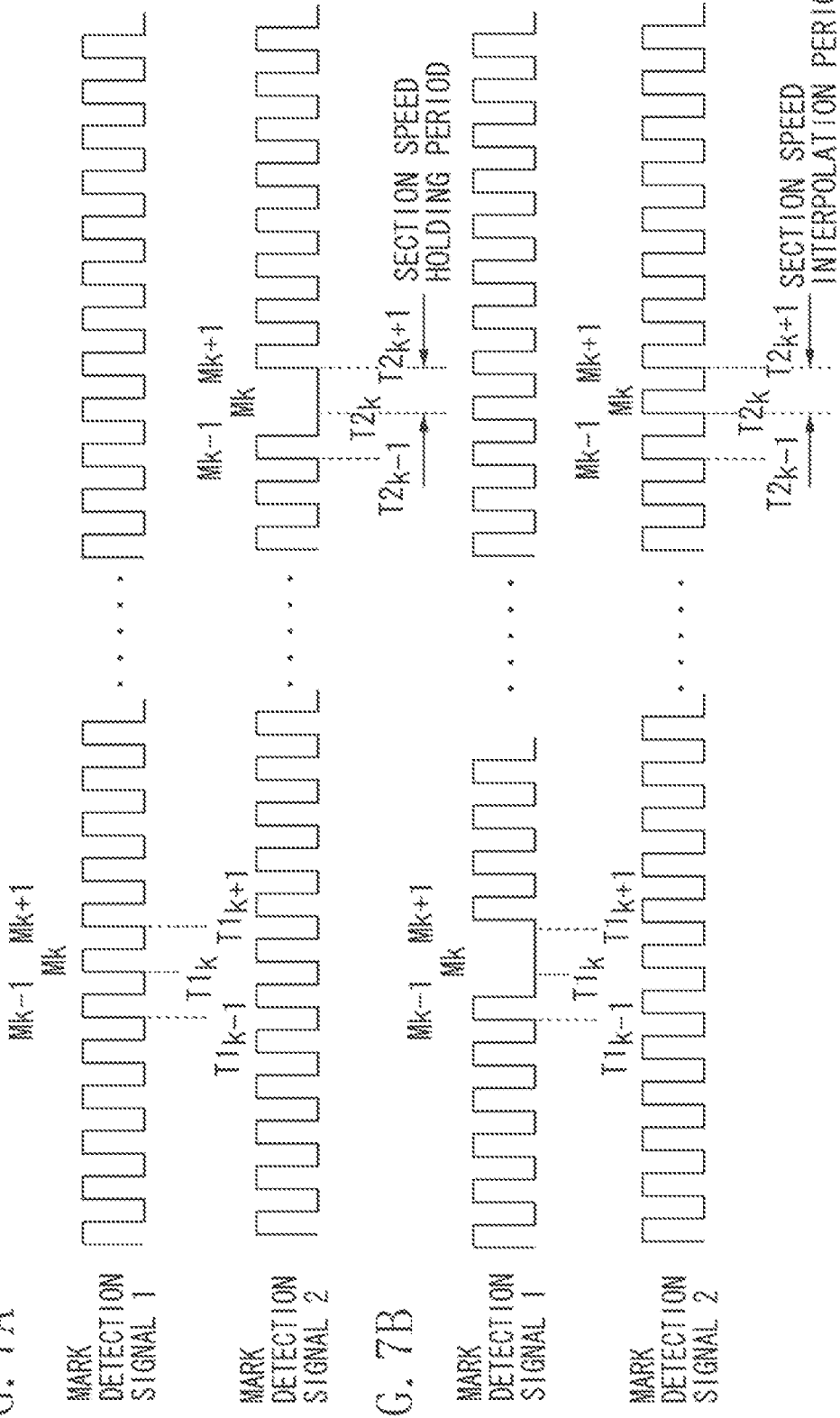
FIGS. 7A and 7B are explanatory diagrams each illustrating a speed detection operation when a mark detection error occurs according to the first exemplary embodiment.

Referring to FIGS. 7A and 7B, detection behaviors for the detected section time when mark detection errors occur in the first sensor 7a and the second sensor 7b according to the present exemplary embodiment will be described. FIGS. 7A and 7B illustrate speed detection operations when mark detection errors occur according to the present exemplary embodiment.

In the drawing, a first half of the mark detection signal indicates two mark detection signals 1 and 2 at time near time T1k when detecting a mark Mk in the first sensor 7a. A latter half of the mark detection signal indicates two mark detection signals 1 and 2 at time near time T2k when detecting a mark Mk in the second sensor 7b.

FIG. 7A illustrates a case where a mark detection error occurs in the second sensor 7b while no mark detection error of a mark Mk occurs in the first sensor 7a. A lower side illustrated in FIG. 7A illustrates a case where a mark detection error of a mark Mk occurs in the second sensor 7b. In this case, the timer value of the second sensor 7b is not updated. Accordingly, a section speed to be output is retained while no mark identification processing operation is performed. As described above with reference to the sequence illustrated in FIG. 5, timer value updating of the second sensor 7b has highest priority in section time updating.

FIG. 7B illustrates a case where a mark detection error of a mark Mk occurs in the first sensor 7a while no mark detection error occurs in the second sensor 7b. In this case, searching in order to perform same mark identification is started by timer value updating of the second sensor 7b, and a timer value of an address where section delay time is smallest is calculated as a timer value 1 by the same mark identification circuit 30.

However, since a difference between the detected section time and the section delay time estimation value exceeds a threshold value, the section detection time abnormality determination circuit 401 determines that it is section time abnormality, and updates the section time to be the result of interpolation processing as described above.

In each of the cases, in the reference speed calculation processing, mark cycle abnormality corresponding to each sensor is detected as described above, and removed from a calculation target of reference speed calculation to carry out the reference speed calculation. Thus, the influence of the mark cycle abnormality in section time estimation is suppressed.

Based on the section time calculation processing, the calculated section speed or section time is output to the control unit 50. The control unit 50 controls driving of the driving motor 6 based on the section speed or the section time, and controls a moving speed of the mobile object 1 driven by the driving roller 5.

The present exemplary embodiment employs a configuration limited to a case where the moving direction of the mobile object 1 is one direction. However, obviously, in a case where a storage unit is also included in the second sensor 7b as in the case of the first sensor 7, or the storage units are switched, if processing is performed according to a moving direction, bidirectional movement can be performed.

The present exemplary embodiment has been described with the optical sensor as an example. However, there is no particular limitation on sensor type or mark form. The disclosure can be applied even to a mark form adaptable to a magnetic or electrostatic sensor, which is not outside the disclosure.

As the driving mechanism control apparatus according to the present exemplary embodiment, the example mounted on the image forming apparatus 110 has been described. However, the application form of the speed detection apparatus is not limited to this.

For example, the speed detection apparatus can be applied to a driving mechanism control apparatus such as a stage of an industrial device system, and the driving mechanism such as the stage can be controlled based on speed information detected by the speed detection apparatus. In this case, detection of a rough speed in the first sensor mark detection time storage processing circuit 10 can be performed based on a driving signal of the driving mechanism control apparatus or a displacement measurement signal in a driving unit (not illustrated). Thus, there is no particular limitation on application of the speed detection apparatus.

The driving mechanism control apparatus includes the speed detection apparatus, a belt driving mechanism for driving the mobile object 1 that is an endless belt member having a scale member attached thereto, and a control unit for controlling the belt driving mechanism based on detected speed information from the speed detection apparatus. The belt driving mechanism includes the driving roller 5 and the driving motor 6. A similar configuration is feasible also in a second exemplary embodiment described below.

According to the present exemplary embodiment, the same mark identification circuit 30 estimates detection time of the same mark in the first sensor 7a on the upstream side based on time information of the section delay time estimation circuit 20. Then, mark detection time of the surest first sensor 7a with respect to the estimated time is sequentially identified. Further, the section speed calculation circuit 40 calculates a detection speed. Thus, identification accuracy of the same mark can be greatly improved, and a more correct speed of the mobile object 1 can be detected.

Further, in the section detection time abnormality determination circuit 401 of the section speed calculation circuit 40, success or failure determination (abnormality determination) of same mark identification based on a difference between the estimated time and the detected section time of the calculated section detection time can be performed. By using this determination result, even when a detection period changes due to distortion of a detection signal around damage or dust, and an undetected state appears, erroneous speed detection can be surely prevented without erroneously identifying the same mark.

One disclosed aspect of the embodiments employs a configuration where speed detection is not performed only during a period where the first and second sensors 7a and 7b are affected by failures such as damage or stain, or a detected speed is determined by interpolation processing. Thus, the driving mechanism control apparatus can be achieved, which can perform highly accurate speed detection where the influence of damage or stain is suppressed, suppress an increase of control errors made by the control unit 50 using received speed information, prevent the driving mechanism from generating an excessive driving force, and improve speed stability of the driven object.

Next, referring to FIG. 9, a speed detection apparatus and a driving mechanism control apparatus according to a second exemplary embodiment of the present will be described. A basic configuration of the present exemplary embodiment is similar to that of the first exemplary embodiment. In the present exemplary embodiment, however, specific position detection circuits 9a and 9b and an inter-sensor distance measurement circuit 80 are added.

In the present exemplary embodiment, on an endless belt-like mobile object 1, a plurality of detection marks 2 is disposed continuously in a moving direction of the mobile object 1 at predetermined pitches Pm (e.g., Pm=500 μm). The detection marks 2 are formed on a thin tape resin, and attached on the entire periphery of an outer peripheral surface outside an image forming region of the mobile object 1.

Figure 11:
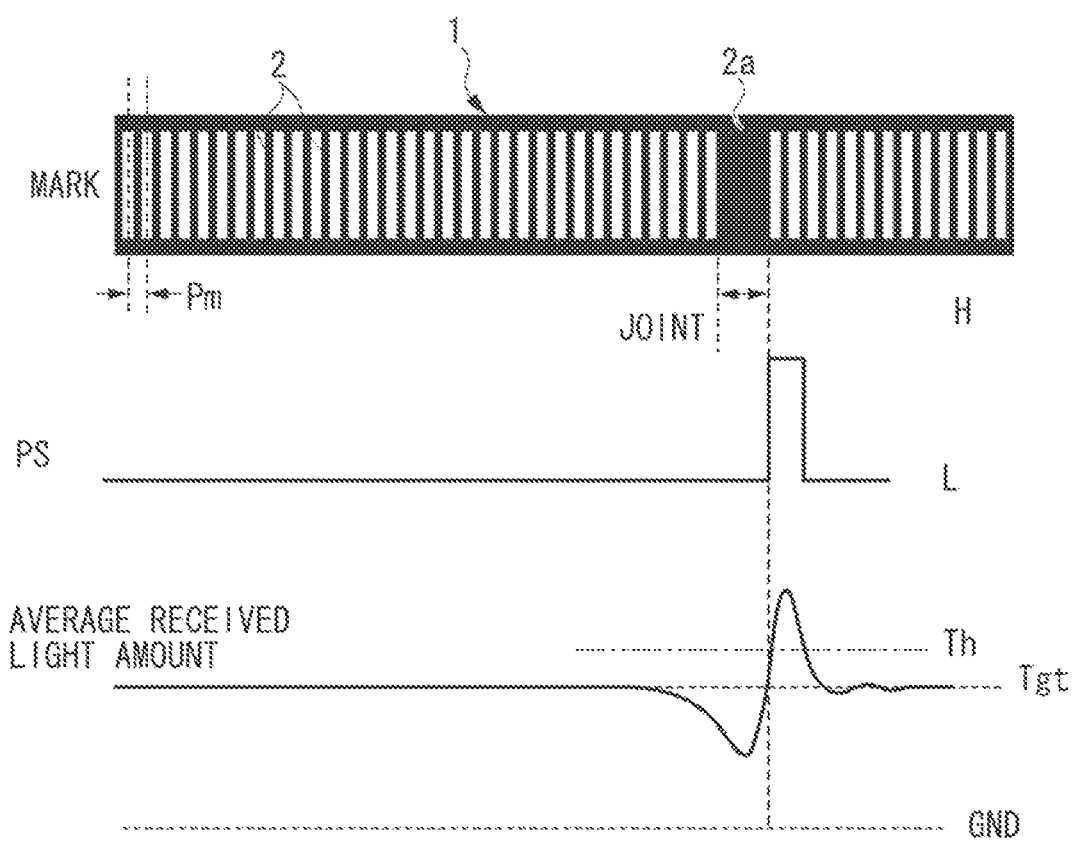
FIG. 11 is an explanatory diagram illustrating a reference mark (special mark) form and an output waveform of the reference mark detection circuit according to the second exemplary embodiment.

On the mobile object 1, a reference mark indicating a reference position in a belt peripheral direction is disposed together with the detection marks 2. In the present exemplary embodiment, as the reference mark, a joined part (joint) 2a of mark columns illustrated in FIG. 11 is used. The joined part 2a constitutes a special mark identifiable among the plurality of detection marks 2. In other words, the plurality of detection marks 2 includes the joined part 2a as a special mark identifiable from the other detection marks 2.

Figure 9:
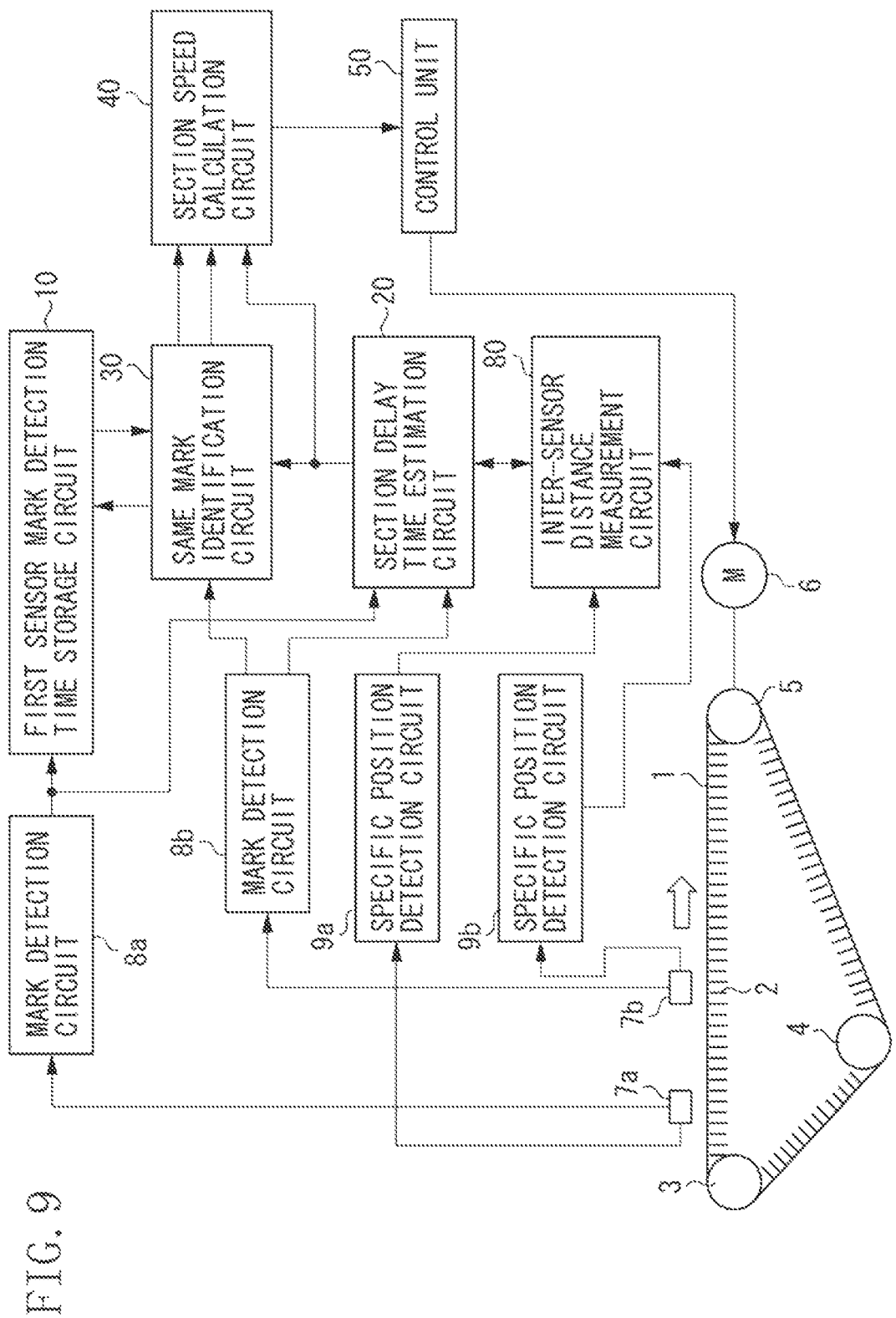
FIG. 9 is a schematic diagram illustrating a speed detection apparatus and a driving mechanism control apparatus according to a second exemplary embodiment.

In FIG. 9, for convenience, the detection marks 2 are located in an inner peripheral surface of the mobile object 1 together with the joined part 2a. In reality, however, they are arranged on an outer peripheral surface of the mobile object 1. The detection marks 2 and the joined part 2a can be arranged on the entire periphery of the inner peripheral surface of the mobile object 1. In such a case, first and second sensors 7a and 7b are arranged on the inner peripheral surface side of the mobile object 1. As a scale member, the detection marks 2 and the joined part 2a can be directly formed in the mobile object 1.

The first and second sensors 7a and 7b reflect light emitted from an internal LED to the detection marks 2 on the moving object 1 and read it. Outputs of the first and second sensors 7a and 7b are respectively input to a mark detection circuit 8a and a specific position detection circuit 9a, and a mark detection circuit 8b and a specific position detection circuit 9b.

Each of the specific position detection circuits 9a and 9b detects the joined part 2a that is a reference mark (special mark), and outputs its detection signal to the inter-sensor distance measurement circuit 80.

The inter-sensor distance measurement circuit 80 calculates a distance between the first and second sensors 7a and 7b from reference speed information and outputs of the specific position detection circuits 9a and 9b, and outputs the calculated value to a section delay time estimation circuit 20.

The specific position detection circuits 9a and 9b constitute a special mark detection time detection unit that detects a time difference between time of detecting the joined part 2a by the first sensor 7a and time of detecting the joined part 2a by the second sensor 7b.

The inter-sensor distance measurement circuit 80 constitutes an inter-sensor distance measurement unit that measures a distance between the first sensor 7a and the second sensor 7b based on output information of the specific position detection circuits 9a and 9b and output information from a first sensor mark detection time storage processing circuit 10. The distance measured by the inter-sensor distance measurement circuit 80 serving as the inter-sensor distance measurement unit is set as a predetermined distance between the first and second predetermined sensors 7a and 7b.

Figure 10:
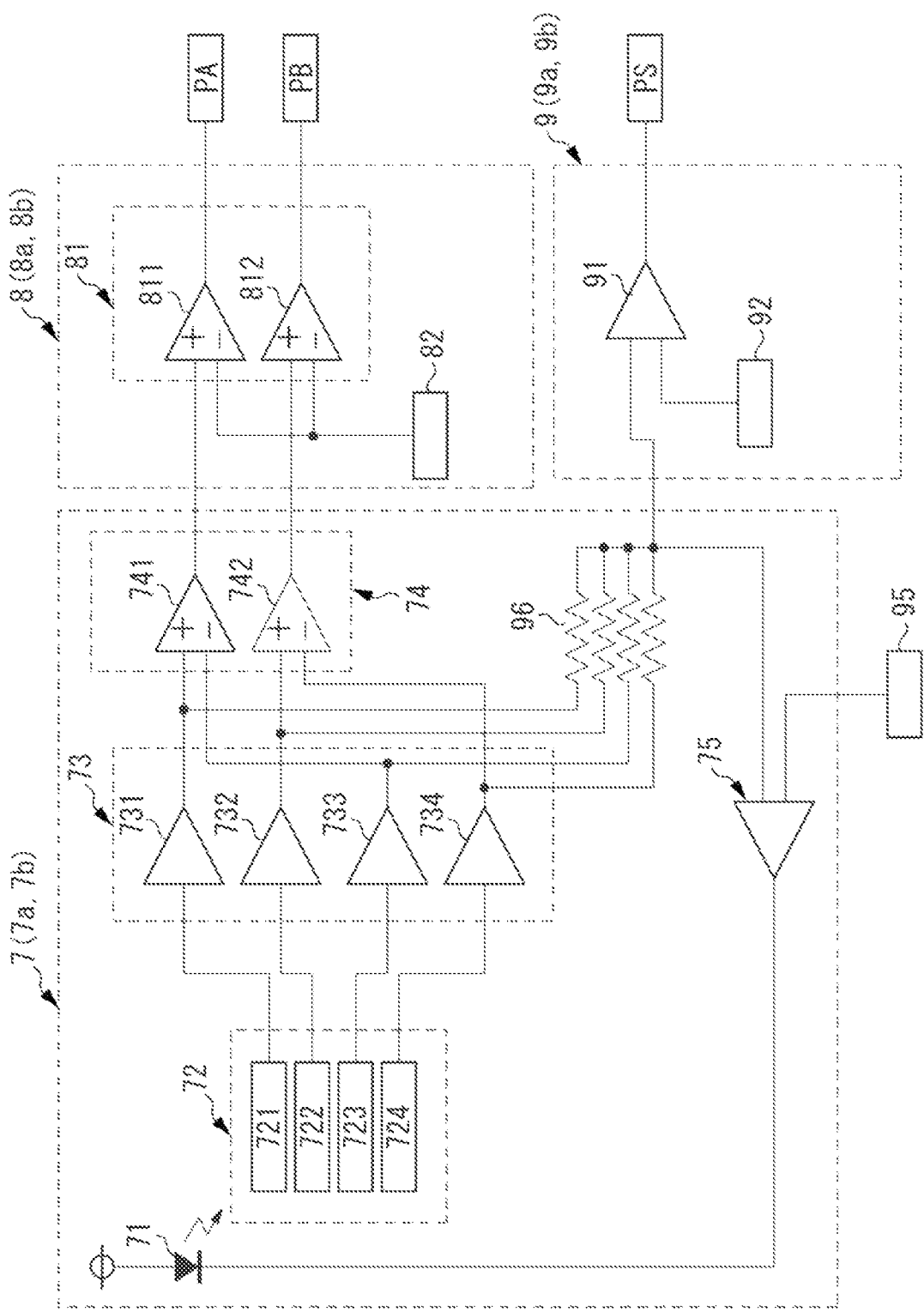
FIG. 10 is a block diagram illustrating first and second sensors, a mark detection circuit, and a reference mark (special mark) detection circuit according to the second exemplary embodiment.

First, referring to FIG. 10, a configuration of the specific position detection circuit will be described. FIG. 10 is a block diagram illustrating first and second sensors, a mark detection circuit, and a reference mark (special mark) detection circuit according to the present exemplary embodiment. The specific position detection circuits 9a and 9b are similar in configuration, and configured as illustrated by a broken line 9 in FIG. 10. Configurations within broken lines 7 and 8 illustrated in FIG. 10 are similar to those of the first exemplary embodiment illustrated in FIG. 2.

The specific position detection circuit 9 (9a and 9b) includes a comparator 91 and a comparison voltage (Th) 92. The comparator 91 compares the comparison voltage 92 input to one terminal with an average output voltage of current-voltage conversion amplifiers 731 to 734 input to the other terminal, to output a digital output PS. The digital output PS is set high when an average light amount is larger than the comparison voltage 92.

Next, referring to FIG. 11, operations and processes of the specific position detection circuits 9a and 9b will be described. FIG. 11 illustrates the digital output PS of the comparator 91, an average received light amount, and a state of detection marks 2 on the object 1.

The detection marks 2 include, as illustrated, portions (white portions) of high reflectance ratios and portions (black portions) of low reflectance ratios, and a space between the detection marks 2 is equal to a predetermined pitch Pm. For the average received light amount, normally, an emission amount of the LED 71 is under auto power control (APC) to achieve a target voltage (Tgt).

Light of the LED 71 in the first and second sensors 7a and 7b is simultaneously applied to a plurality of detection marks 2. At a portion where the detection marks 2 are continuous, an average reflectance ratio of the portions of high and low reflectance ratios is set. However, at a joined part 2a of the detection marks 2, there is no detection mark 2 since only a portion of a low reflectance ratio is present.

Since an average received light amount is under APC to achieve a Tgt value at the joined part 2a as well, much current for the LED 71 may flow due to the low reflectance ratio. In reality, however, because of APC response time, the average received light amount is once reduced as illustrated in FIG. 11.

Then, because of the APC response, a light amount output of the LED 71 increases, and the average received light amount increases. When the light passes through the joined part 2a at this time to reach a portion having a detection mark 2 again, a reflected light amount increases. This time, the average received light amount exceeds the Tgt value, and further exceeds the comparison voltage (92) Th. Then, owing to the APC response, the average received light amount is converged to the Tgt value again.

The comparator 91 detects a state where the average received light amount exceeds the comparison voltage Th, and outputs a digital output PS as a specific position detection signal. The portions described thus far referring to FIG. 10 can be mounted as integrated circuits (IC) within one sensor package.

Figure 12:
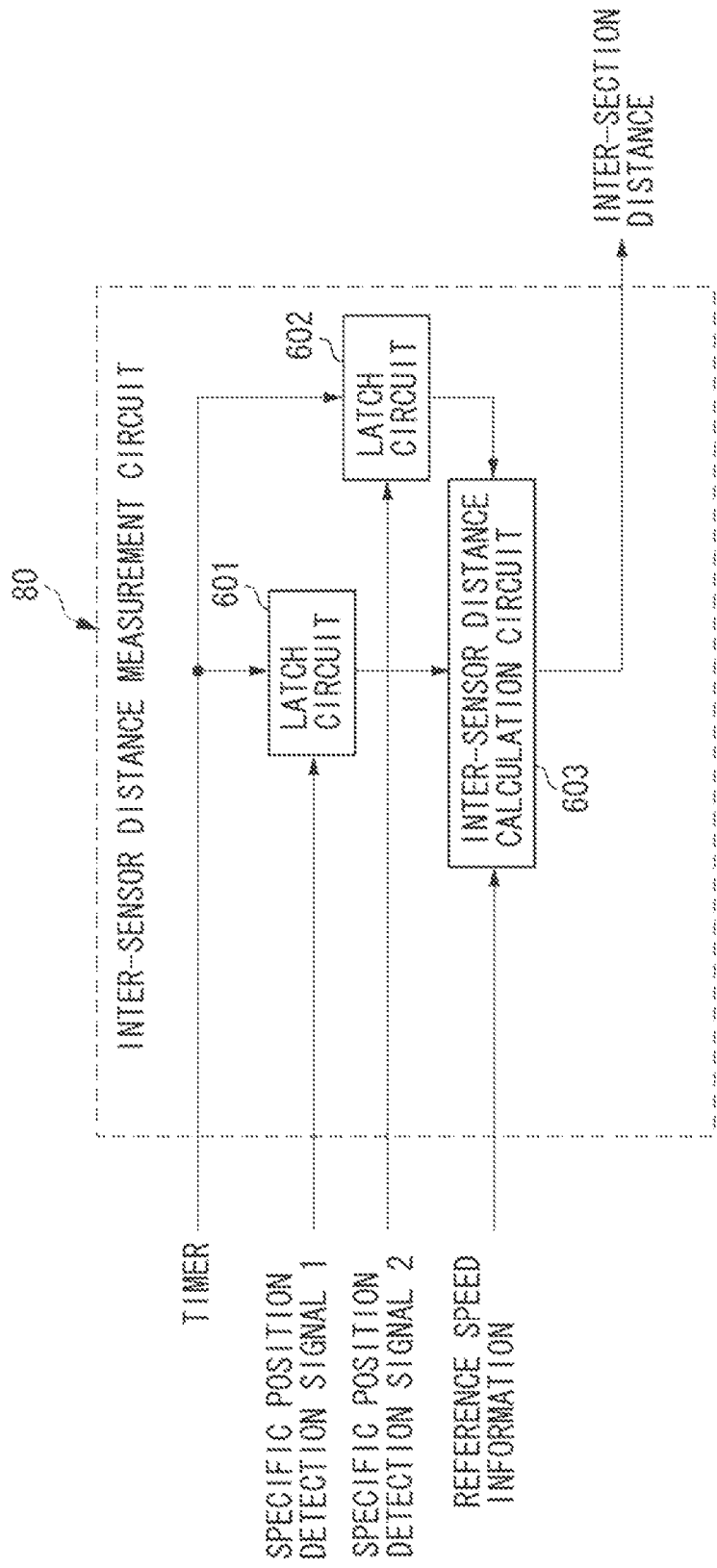
FIG. 12 is a block diagram illustrating an inter-sensor distance measurement circuit according to the second exemplary embodiment.
Figure 14:
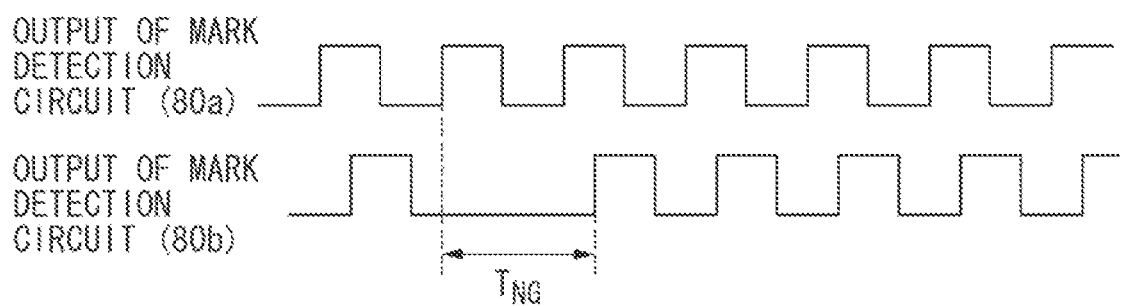
FIG. 14 is an explanatory diagram illustrating an output waveform in section speed detection caused by a mark failure.

Next, the inter-sensor distance measurement circuit 80 illustrated in FIG. 9 will be described referring to FIG. 12. FIG. 12 is a block diagram illustrating the inter-sensor distance measurement circuit 80 according to the present exemplary embodiment.

As illustrated in FIG. 12, the inter-sensor distance measurement circuit 80 includes latch circuits 601 and 602, and an inter-sensor distance calculation circuit 603. Specific position detection signals 1 and 2 are output signals of the specific position detection circuit 9a and 9b, and reference speed information Vref is information calculated by the section delay time estimation circuit 20. The specific position detection signals 1 and 2, the reference speed information Vref, and a timer value are input to the inter-sensor distance measurement circuit 80.

The latch circuits 601 and 602 latch rising edges of the specific position detection signals 1 and 2 as the timer value.

The inter-sensor distance calculation circuit 603 subtracts a timer count value output from the latch circuit 601 from a timer count value output from the latch circuit 602 to calculate a time difference between the specific position detection signals. This time difference is section time (time difference) $T_L$ when the joined part 2a as a specific position passes between the first and second sensors 7a and 7b.

From the section time $T_L$ and the reference speed information Vref, a distance (predetermined distance L) between the first and second sensors 7a and 7b can be calculated by the following expression:

$$L = V\text{ref} \times T_L$$

For the reference speed information Vref in this case, reference speed information near detection time of the specific position detection signal is desirably used.

The inter-sensor distance measurement circuit 80 outputs the calculated inter-sensor distance (predetermined distance L) to use it as a section inter-sensor distance at the section delay time estimation circuit 20. The operation of calculating the inter-sensor distance only needs to be carried out, for example, at the time of factory shipment or a belt conveyance start.

Inter-sensor distance detection accuracy in this processing depends on a method for detecting a reference speed, for example, on mark cycle accuracy in the present exemplary embodiment. For example, compared with mounting accuracy of two sensors on a substrate in designing, the inter-sensor distance can be detected with much higher accuracy.

In the image forming apparatus 110 according to the present exemplary embodiment, detection accuracy of a relative speed change is required, and thus the present exemplary embodiment provides a sufficient effect.

The present exemplary embodiment can provide effects similar to those of the first exemplary embodiment.

According to the present exemplary embodiment, since the time of detecting the same mark by the first and second sensors can be identified by the same mark detection time identification unit, identification of the same mark can be surely carried out. Thus, a configuration that prevents control errors from increasing even when there is a mark failure such as a joint, damage, or stain in the detection mark, can be realized.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-257508 filed Nov. 26, 2012, which is hereby incorporated by reference herein in its entirety.

What is claimed is:

1. A speed detection apparatus comprising:
a scale member including a plurality of detection marks continuously arranged at a predetermined pitch, the detection marks including a special mark identifiable from the other detection marks;
first and second sensors spaced from each other by a predetermined distance larger than the predetermined pitch, and configured to detect the detection;
a first detection unit configured to detect a reference speed of the scale member;
a second detection unit configured to detect a time difference between time of detecting the special mark by the first sensor and time of detecting the special mark by the second sensor;
a measurement unit configured to estimate a distance between the first sensor and the second sensor based on output of the second detection unit;
a storage unit configured to store time when each of the first and second sensors detects a detection mark, and an address corresponding to the detection mark;
an identification unit configured to identify, based on output of the first detection unit, time when the first and second sensors detect the same mark, from the address and the time stored in the storage unit; and
a calculation unit configured to calculate, based on output of the identification unit, output of the first detection unit, and output of the measurement unit, a speed of the scale member.

2. The speed detection apparatus according to claim 1, wherein the detection unit detects the reference speed based on mark cycle detection time of the detection marks by at least one of the first and second sensors, and the predetermined distance between the first sensor and the second sensor.

3. The speed detection apparatus according to claim 1, wherein the detection unit performs, when the reference speed is detected by using both the first and second sensors, averaging processing on the reference speed detected by the first sensor and the reference speed detected by the second sensor.

4. The speed detection apparatus according to claim 1, further comprising a determination unit configured to determine presence of abnormality based on determination as to whether the relative speed calculated by the calculation unit is within a threshold value.

5. The speed detection apparatus according to claim 4, further comprising a processing unit configured to perform, when the determination unit determines that there is abnormality, interpolation processing on the relative speed and to output its result.

6. A driving mechanism control apparatus comprising:
the speed detection apparatus according to claim 1;
a driving mechanism configured to drive an endless belt member to which the scale member is attached; and
a control unit configured to control the driving mechanism based on detected speed information obtained from the speed detection apparatus.

7. A driving mechanism control apparatus comprising:
a movable belt including a plurality of detection marks continuously arranged at a predetermined pitch;
a driving source configured to apply a driving force to the belt;
first and second sensors spaced from each other by a predetermined distance larger than the predetermined pitch, and configured to detect the detection marks, the second sensor being disposed at a downstream of the first sensor with respect to a moving direction of the belt;
an identification unit configured to identify, in a case where an absolute value of a difference between a detection time of a signal of the first sensor and a detection time of a signal of the second sensor is a reference time or less, the signals as a pair of signals corresponding to a same mark;
a determination unit configured to sequentially obtain an estimated time during which the belt moves from the first sensor to the second sensor based on a period of time from when a first detection mark is detected until when an N-th detection mark is detected by each of at least one of the first sensor and the second sensor with respect to an N-number of the plurality of detection marks continuously arranged on the belt, and sequentially determine the reference time based on the estimated time; and
a control unit configured to control the driving source to control a speed of the belt based on the difference between the detection times of the pairs of signals corresponding to the same mark identified by the identification unit.

* * * * *